United States Patent [19]
Hartman

[11] Patent Number: 5,833,812
[45] Date of Patent: Nov. 10, 1998

[54] LOW MAINTENANCE WATER DISTILLER

[76] Inventor: Michael Orban Hartman, 7553 Brazil Rd., Benton, Ark. 72015

[21] Appl. No.: 604,715

[22] Filed: Feb. 21, 1996

[51] Int. Cl.⁶ .................................. B01D 3/42; C02F 1/04
[52] U.S. Cl. ........................... 203/1; 202/181; 202/185.3; 202/197; 202/206; 203/4; 203/10; 203/40; 203/100; 392/325
[58] Field of Search .................................. 203/10, 4, 1, 2, 203/100, 40, 12, DIG. 18; 202/185.3, 206, 197, 181, 193, 196, 266; 159/44, 47.3; 392/234–327, 403; 137/391; 165/182

[56] References Cited

U.S. PATENT DOCUMENTS

| | | |
|---|---|---|
| 2,816,064 | 12/1957 | Smith . |
| 3,382,157 | 5/1968 | Barnstead . |
| 3,423,293 | 1/1969 | Holden . |
| 3,584,193 | 6/1971 | Badertscher . |
| 3,644,929 | 2/1972 | White et al. . |
| 3,682,141 | 8/1972 | Johansen .................................. 122/382 |
| 3,925,167 | 12/1975 | Rodgers . |
| 3,944,785 | 3/1976 | Easton-Williams . |
| 4,092,519 | 5/1978 | Eaton-Williams . |
| 4,146,775 | 3/1979 | Kirchner et al. ........................ 219/295 |
| 4,331,514 | 5/1982 | Bauer . |
| 4,382,173 | 5/1983 | Howard-Leicester . |
| 4,394,561 | 7/1983 | Zerbel . |
| 4,431,905 | 2/1984 | Slocum . |
| 4,437,430 | 3/1984 | Howard-Leicester et al. . |
| 4,532,413 | 7/1985 | Ahonen .................................. 219/279 |
| 4,770,748 | 9/1988 | Cellini et al. . |
| 4,877,489 | 10/1989 | Lloyd ..................................... 202/197 |
| 4,894,123 | 1/1990 | Helmich ................................. 202/176 |
| 4,933,046 | 6/1990 | May . |
| 5,095,287 | 3/1992 | Harkey, Sr. . |
| 5,222,185 | 6/1993 | McCord, Jr. ........................... 392/314 |
| 5,305,415 | 4/1994 | Stevens . |
| 5,484,410 | 1/1996 | Hartman et al. . |
| 5,571,385 | 11/1996 | Faur et al. .............................. 203/10 |

*Primary Examiner*—Virginia Manoharan
*Attorney, Agent, or Firm*—Browning Bushman

[57] ABSTRACT

The water distiller 10 includes a plurality of housings 12, 14, 16 each mounted below a support plate 32. A voltage regulator 144 maintains a desired voltage potential between heating probes 34 and 36 within a heating bowl 46. An operator selector 142 automatically regulates the flow of water through inlet valve 70 to control the incoming water flow rate to the heating bowl. Area contact between water in the heating bowl and a substantially horizontal plate 42 at the lower end of each heating probe determines the electrical power used by the distiller, and maintains water in the heating bowl at substantially a constant level. An improved particle trap 80 and vent valve 100 provide reliable and safe operation of the distiller. Heating bowl 46 and a water inlet line 76 may be easily removed for cleaning the distiller.

19 Claims, 3 Drawing Sheets

LOW MAINTENANCE WATER DISTILLER

FIELD OF THE INVENTION

The present invention relates to a water distiller of a type commonly used in homes or businesses for generating distilled drinking water. More particularly, this invention is directed to a relatively light weight water distiller which may be conveniently mounted in a variety of locations, which requires relatively low maintenance, and which has high safety and reduced noise generation.

BACKGROUND OF THE INVENTION

Various types of water distillers have been devised for generating distilled drinking water. As the public becomes more concerned with the quality of tap water for both drinking and cooking, acceptance of water distillers for home and office use is increasing. One example of a water distiller with improved probes is disclosed in U.S. Pat. No. 5,484,510. Further acceptance of water distillers requires improvements to lower the cost of the distiller, to increase versatility in the locations where the distiller may be installed, and to reduce noise generated by the distiller. Most importantly, significant improvements are required to reduce the required maintenance to reliably and safely operate the water distiller. Most commercially available water distiller manufacturers suggest that the unit be thoroughly cleaned at least once a week, and reliable cleaning is both difficult and labor intensive. Accordingly, distillers are frequently not properly cleaned, contaminants build up in the unit which adversely effect both its operation and the quality of the distilled water, and the user frequently discontinues regular use of the distiller.

One of the problems associated with both the cost and high maintenance of water distillers relates to the use of stainless steel heating bowls and condensing units. Expensive metal distillation components are commonly used to facilitate thorough cleaning by the user, and to withstand the high temperature generated by conventional high resistance heating elements. Deposits commonly accumulate in the heating bowl, and various flow lines and supporting mechanisms must be disconnected to remove and clean the bowl. Both the heating bowl and the condensing unit are often difficult to remove from the distillation assembly, and once removed these components cannot generally be easily cleaned.

Many water distillation assemblies are sized to be supported on a self-supporting distillation stand, thereby increasing the cost of the assembly. Other distillation assemblies have been proposed for positioning on a countertop or other planar support surface, although many individuals wish to keep countertops clean for use as work surfaces. Versatility in positioning a distillation assembly is thus a significant factor in the acceptability of water distillation units for home and office use.

Most distillers allow an operator to control the rate at which water is distilled by regulating the power supplied to the unit. Slower distillation results in less noise generated by the unit, although a fast distillation rate is obviously desired when water consumption is high. High noise is frequently the result of a high speed fan, which is required to generate the air flow required for the type of radiator used in the distiller. Controls which regulate the maximum power to the heating elements of the unit and techniques for controlling the power input to the distillation assembly are, however, expensive and frequently do not provide the level of control desired by the operator.

Those skilled in the art of heating fluids have long recognized that a fluid may be heated by transmitting a current between electrodes emerged in an ionic liquid, such as water with electrolytes added to increase conductivity. U.S. Pat. Nos. 3,584,193, 4,347,430, and 4,382,173 disclose air humidifiers which use water as an electrically conductive medium when heating the water. U.S. Pat. No. 3,423,293 discloses a boiler for distilling saline water wherein steam is compressed adiabatically. U.S. Pat. No. 3,644,929 discloses an electrothermal cell designed for reducing arcing. U.S. Pat. No. 4,431,905 discloses a condensate evaporator which uses a salt impregnated pad to remove condensate from a refrigeration system. U.S. Pat. Nos. 3,944,785 and 4,092,519 discloses steam boilers for providing steam to an air conditioning plant. U.S. Pat. No. 4,394,561 discloses an air humidifier for generating steam for an air distribution system. U.S. Pat. No. 5,305,415 discloses a steam generator for removing wallpaper.

U.S. Pat. No. 3,925,167 discloses a multiple stage still designed for use with saline water. U.S. Pat. No. 4,933,046 discloses the use of light weight materials, such as plastics, for applications involving high temperature fluids. U.S. Pat. No. 5,059,287 discloses a portable water distiller which heats a thin layer of water at a low temperature. U.S. Pat. Nos. 2,816,064, 3,382,156, and 4,770,748 disclose various designs for baffles used in distillation equipment. A complex water distiller is disclosed in U.S. Pat. No. 4,331,514.

The disadvantages of the prior art are overcome by the present invention, and an improved water distiller is hereinafter disclosed which has low maintenance and which may be periodically cleaned in a short amount of time. The distillation assembly is light weight, has a comparatively low manufacturing cost, and is designed either for mounting in various locations or as a self-supporting or stand alone assembly. Improved techniques are used to heat the incoming water to generate steam, and to reliably control the operation of the distillation assembly.

SUMMARY OF THE INVENTION

A preferred embodiment of the water distiller comprises a plastic heater housing, a plastic fan and control housing, and a plastic tank housing each supported below a unitary plate, which in turn is constructed for securing to the lower planar surface of a countertop or cabinet. The light weight distiller assembly has a relatively low manufacturing cost, and may be mounted in a variety of low utility spaces. Water is heated by passing current through the water between at least two partially submerged probes, thereby generating steam without creating hot spots commonly found in distillers with resistive-type heating probes. The heating bowl, the condensing unit, and the tank are each fabricated from plastic for easy cleaning.

By utilizing water as an electrically conductive medium, steam is generated in a manner which reduces contaminants in the heated water from passing with the steam to the condensing unit. A particle trap with a horizontal chamber interconnecting a steam trap inlet and a steam trap outlet further reduce contamination of the condenser. Gasses are given time to separate in the particle trap. The separation of carbon dioxide from steam prevents the formation of carbolic acid in the condenser, which adversely effects the taste in the finished water. Contaminants in the steam adhere to condensate on the particle trap walls, are captured in the condensate, then drop back to the water in the heating bowl. A plastic heating bowl may be easily removed from the heater housing for periodic cleaning, with the heating probes remaining in place. A water inlet probe transmits incoming water through the particle trap to a lower end of the heating bowl, and may also be easily removed for cleaning once the heating bowl is removed. The condensing unit includes a series of fin and tube heat exchangers fluidly interconnected with plastic end caps for efficient periodic cleaning of the condensing unit.

A microprocessor control unit with an operator input regulates the amount of incoming water to the heating bowl. Each of two heating probes are supported at an upper end within the heater housing, and include a substantially horizontal plate at its lower end for engagement with the surface of the water in the heating bowl. Rather than limiting the electrical power to the heating probes, the distiller of the present invention regulates an inlet water valve to control the water added to the heating bowl and thus the level of water within the heating bowl. Within reasonable limits, the rate of added water is equal to the rate of generated condensate, and accordingly the water level in the bowl remains substantially constant. A slight fluctuation in the water level in the bowl will significantly increase the contact surface area between the substantially horizontal probe plates and the water, thereby allowing more electrical power to be transmitted through the water and generating more steam, which in turn reduces the water level and accordingly the electrical power consumption.

The water distiller includes various safety features which enhance its reliable operation and utilization. An electrical interlock is provided for engagement with the heating bowl, such that electrical power to the heating probes is only provided when the bowl is properly secured within the heater housing. A vent valve provided along the flow line between the particle trap and the condenser unit is automatically opened in response to air flow generated by the fan and moving past the condensing unit. When the fan is not operating, the vent valve is closed to prevent contamination. The heating bowl is insulated for safety. A mechanical interlock may be provided to prevent removal of the heating bowl until the water temperature in the bowl is below a selected value. Relatively cool water is discharged from the condenser unit due to its series design, thereby minimizing the likelihood of hot condensed water injuring the user.

It is an object of this invention to provide an improved water distiller which has a relatively low maintenance. By designing the distiller for reduced maintenance, the acceptability of the distiller is enhanced and its utility in home and office environments is substantially increased.

It is another object of the invention to provide a relatively low cost and compact distiller which may be conveniently mounted in a variety of locations. By minimizing or eliminating floor space and counter space required for the distiller, the number of applications where the distiller may be conveniently used is significantly increased.

Still another object of the invention is that the water input rate to the heating bowl is selectively controlled by the operator. The heating probes include substantially horizontal plates which significantly increase the water contact area when the water level in the bowl rises slightly, so that a substantially constant level of water is provided in the heating bowl. By directly controlling the water input rate, the distiller output is directly controlled in a cost-effective manner. By minimizing the quantity of water in the heating bowl and by reducing the temperature of condensate from the condenser unit, a reduced level of noise is output by the distiller.

A significant feature of the invention is the extensive use of plastic materials, particularly for the heating bowl and the condensing unit, to lower the cost and weight of the distiller. The use of plastic materials for the heating bowl and the condenser unit further enhances the maintenance of the distiller by allowing the equipment to be periodically cleaned with a minimal amount of time and expertise.

An improved particle trap with a horizontal chamber between the steam inlet and the steam outlet reliably reduces contamination in the distilled water. The particle trap is configured so that condensate on the walls of the trap collect contaminates, which then drop back to the water in the heating bowl. Another feature of the invention is the use of an improved vent valve to reliably vent gas from the distiller only when the condensing unit fan is operating.

An advantage of the distillation assembly is that it is designed for mounting under a countertop or cabinet. The distillation assembly is relatively compact and light weight. Substantially the same distillation unit may, however, also be wall mounted, or may be supported on a stand.

A significant advantage of the distillation assembly is its ease of use and high safety. The distillation assembly may be reliably used by numerous individuals, and may be easily and quickly cleaned.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 1:
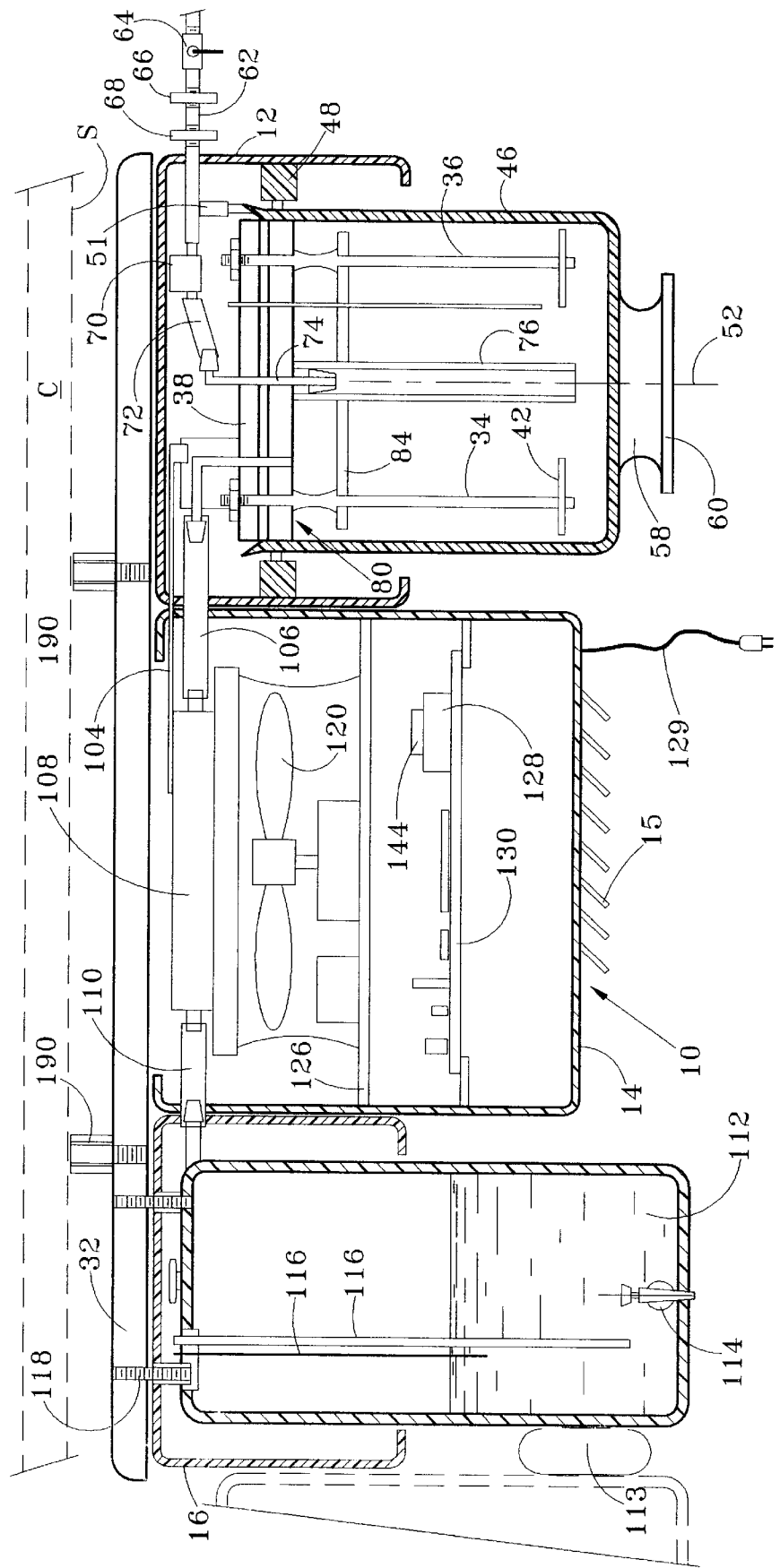
FIG. 1 is a side view of a suitable embodiment of a distillation assembly, partially in cross-section, according to the present invention.
Figure 4:
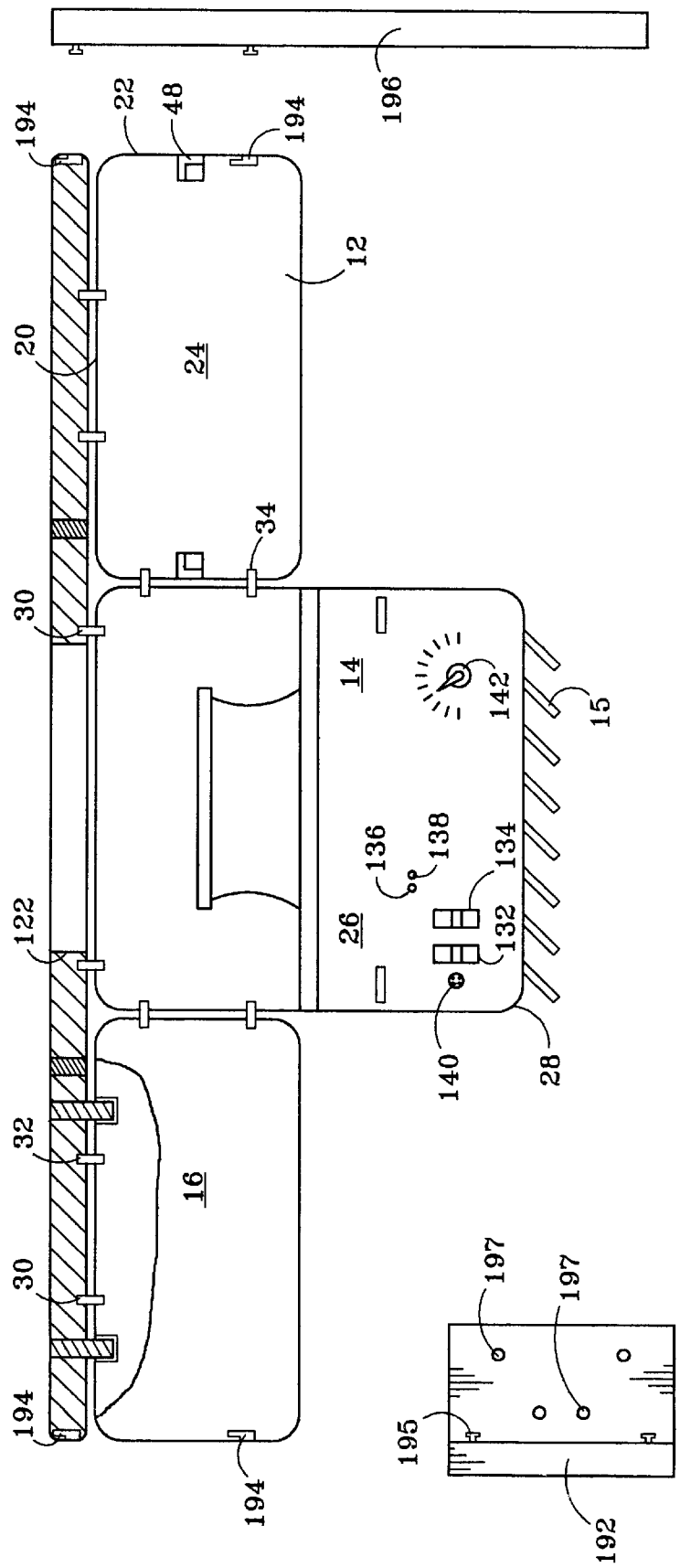
FIG. 4 illustrates the distiller housings generally shown in FIG. 1, and an optionally wall mounted bracket and a support stand for interconnection with the housings.

A water distiller 10 as shown in FIG. 1 is specifically designed for mounting underneath a cabinet or countertop generally represented by C and having a lower substantially planar support surface S. The distiller comprises a heater housing 12, a condenser unit and control housing 14, and a tank housing 16 each preferably fabricated from plastic. As shown in FIG. 4, the general configuration of the housings 12 and 16 may be substantially identical, with each housing having a top plate 20 and a cylindrical side plate 22 forming an inverted cup configuration defining an interior cavity 24 therein. The housing 14 includes a cylindrical side plate 26 and louvered bottom plate 28 for passing air upward through the housing 14.

Still referring to FIG. 4, each housing 12, 14 and 16 may be secured by conventional fasteners 30 to a unitary planar mounting plate 32. Accordingly, each housing may be supported directly from the support plate 32. Additional fasteners 34 may be used to attach the side plates of housings 12 and 16 to the side plate of housing 14. Alternatively, each housing 12, 14 and 16 may be supported from and positioned below the support plate 32, with housing 12 and 16 being directly supported by the plate 32 and housing 14 being supported by the housings 12 and 16. Those skilled in the art will appreciate the various mechanical fasteners may be used to secure the housings below the support plate 32.

Referring again to FIG. 1, the distiller includes first and second heating probes 34 and 36 each secured at an upper end within the interior cavity 24 within the housing 12 and extending downward therefrom. More particularly, a planar disk-shaped probe support plate 38 is securely mounted within the housing 12 by a plurality of conventional securing members (not shown). The upper end of each heating probe passes through an aperture in the support plate 38 and is secured in place by a conventional nut 40 (see FIG. 2). Each heating probe 34, 36 is electrically connected to a power supply as discussed subsequently, although the electrical lines are not shown in FIG. 1 for clarity. The lower end of each rod-like heating probe 34, 36 includes a substantially horizontal plate portion 42 which is also discussed in detail below. Each plate portion 42 may be welded or otherwise affixed to the rod-like heating probe, with a short rod extension 44 extending below the plate portion, as shown.

The heating bowl 46 is removably secured to the housing 12. More particularly, an interlock ring 48 is provided within the housing 12 and adapted for engagement with an arcuate flange 50 secured to and extending radially outward from the upper outer surface of the bowl 46. A mechanical interlock between the bowl 46 and the housing 12 may be made by a simple pushed and twisting motion so that the flange 50 is latched in place. Various other mechanical interconnections may be provided for removably interconnecting the bowl with the housing 12. For example, the upper end of the bowl 46 may be threaded for engagement with internal threads on an interlock ring secured within the housing 12.

Plastic material bowl 46 includes a central axis 52 which is vertical when the bowl is secured to the housing 12. The bowl 46 includes a cylindrical plastic outer wall 54 and a cylindrical plastic inner wall 56 each separated by an air gap. Each wall 54 and 56 also has a cup-shaped configuration, so that an air gap is also provided between the walls in the bottom of the bowl. The air gap between the walls reduces heat loss from the bowl, and also allows the operator to comfortably remove the bowl 46 using the bowl handle 58 with the bowl 46 containing heated water. If desired, an outer insulation layer (not shown) may be provided along the portion of the outer bowl 56. Plastic bowl support or handle 58 is secured to the lower end of the outer wall 54 of the bowl. The bowl support 58 provides a convenient handle for allowing the operator to manipulate the bowl 46 as the bowl is mechanically connected to the housing 12. A planar lower surface 60 on the support 58 also allows the bowl to be supported on a table or countertop in an upright position during periodic bowl maintenance.

Water is input to the bowl through an inlet flow line 62. A conventionally manually operated shutoff valve 64 is provided along flow line 62, so that the water inlet line 62 may be easily connected to and removed from a conventional municipal water system. As explained subsequently, however, a particular feature of this invention is that the distiller 10 may be used to generate distilled water from various types of water supplies, including brine water and water with a high metal content. Accordingly, it should be understood that the flow line 62 may be interconnected with various types of water sources. For remote applications, a pump (not shown) may thus be used for providing contaminated water to the distiller. If desired, a filter 66 may be provided downstream from the valve 64 for removing solid contaminants in the water. A flow controller 68 is also provided along the flow line 62, and serves to provide a substantially stabilized and reduced water flow rate to the inlet water valve 70, which is discussed in detail below. Those skilled in the art will appreciate that the flow line 62 may be formed from various rigid or flexible flow line materials, such as plastic, and that the shutoff valve 64, the filter 66, and the flow controller 68 may be provided at any suitable location for mounting these components along a flow line 62.

Water passing by the inlet water valve 70 is transmitted by gravity through the inclined tube 72, through the bend tube 74, and through the vertical water inlet tube 76 for discharge into the lower end of the bowl 46. Tapered plugs 78 may be provided at each end of the bend tube 74 for sealing between the bend tube and the inclined tube 72 and water inlet tube 76, respectively. Each of the tubes 72, 74 and 76 may be fabricated from a plastic material. The water inlet tube 76 is preferably fabricated from a non-stick plastic, such as tetrafluoroethylene, which is able to withstand the high temperature within the bowl 46. Input water is thus introduced at the bottom of the bowl 46 at a low flow rate equal to the rate of generated condensate, as explained subsequently. Introduced water in the bowl 46 moves in a substantially toroid pattern about the central axis 52, and is heated by the probes to generate steam.

The generated steam rises within the vaporization chamber 47 spaced within the bowl 46 above the plates 42 and below the particle trap 80. Ideally the vertical length of the vaporization chamber 47 within the bowl 46 is at least two inches, and preferably is from 2.5 to 3.5 inches, so that contaminants carried by the steam tend to fall back into the water W before entering the particle trap, but the distiller 10 is still compact. Particle trap 80 is positioned within the housing 12 and within the upper end of the bowl 46, and includes a disk-shaped plastic top plate 82 and a disk-shaped plastic bottom plate 84. Steam from the vaporization chamber 47 enters the particle trap 80 through the steam inlet 86 provided in the bottom plate 84, and exits the particle trap through the steam outlet port 88 in the top plate 82. It is important according to the present invention that ports 86 and 88 be horizontally spaced apart a substantial distance. For the embodiment as discussed herein wherein the plates 82 and 84 each have a circular configuration, the inlet port 86 is spaced circumferentially opposite the outlet port 88. The plates 82 and 84 are separated by a horizontal gap which forms a substantially planar chamber 87 for transmitting steam between the inlet port 86 and the outlet port 88. It is important that the volume of the horizontal gap in chamber 87 be sized so that steam passing between the plates 82 and 84 moves at a velocity substantially lower than the steam passing through the ports 86 and 88. This low velocity allows contaminants within the steam to adhere to condensate on the lower surface of the top plate 82 and on the upper surface of the bottom plate 84 so that condensate droplets containing contaminants may drop through the vaporization chamber 47 back into the water W within the lower end of the heating bowl 46. The low flow velocity through the chamber 87 also gives gas generated with the steam time to separate from the steam so that this undesirable gas may be vented, as explained below. Oxygen, carbon dioxide and other gasses contained in the incoming water are released with the steam, but separate from the steam in the low velocity particle trap. Once separated from the steam, these gasses are then vented upstream from the condenser unit.

Bend tube 74 passes through the support plate 38 and through the top plate 82 of the particle trap 80. A lower seal 78 between the bend tube 74 and the water inlet tube 76 is positioned within the gap of chamber 87 between the plates 82 and 84. Water inlet tube 76 passes through aperture 90 in lower plate 84. Each of the heating probes 34 and 36 include an enlarged sleeve portion 92 for maintaining the desired spacing between the upper and lower plates of the particle trap 80. Particle trap 80 is thus effectively supported on the heating probes 34 and 36, which in turn are suspended from the support plate 38. One or more sensor probes 94 also supported from the plate 38 extend downward through the particle trap 80 and into the vaporization chamber 47. Sensor probes may be used to monitor the conditions of vapor within the vaporization chamber, and may be similar to the condenser probes described in U.S. Pat. No. 5,484,510.

The outer diameter of the lower plate 84 may be only slightly less than the inner diameter of the bowl 46, so that substantially all steam entering the particle trap passes through the inlet port 86. A small amount of steam may pass between the outer diameter of the lower plate 84 and the bowl 46. Condensate which accumulates within the particle trap may drip back to the water in the heating bowl by passing through the slight annular gap between the lower plate 84 and the bowl 46, or through the inlet port 86, or through the slight gap between the outer diameter of the members 34, 36, 76, and 94 and the sides of the respective apertures in the lower plate through which these members pass.

Figure 2:
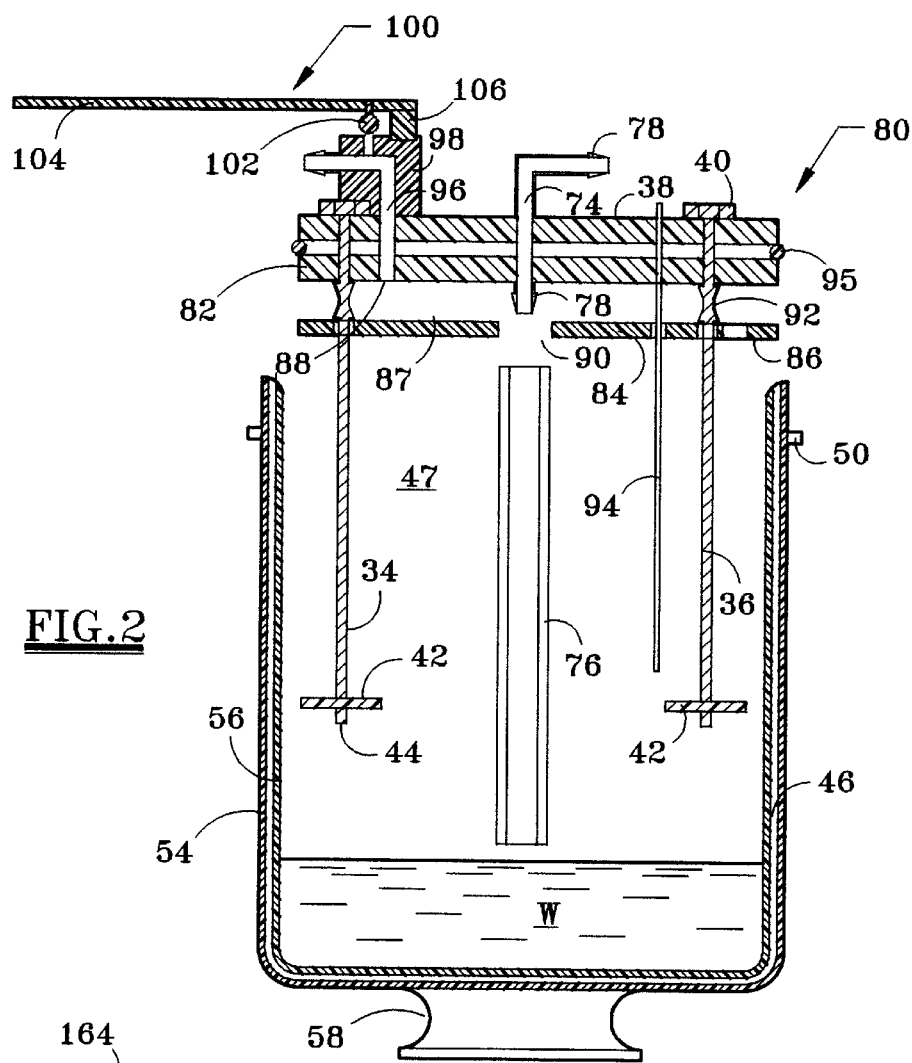
FIG. 2 is a more detailed view of the removable bowl, the particle trap, and the heating probes generally shown in FIG. 1.

An O-ring seal 95 is provided for sealing between the outer diameter of the support plate 38 and the inner diameter of the bowl 46. For the embodiment as depicted in FIGS. 1 and 2, the O-ring seal 95 is spaced between the support plate 38 and the top plate 82 of the particle trap 80. Those skilled in the art will appreciate that various types of seals may be used to provide a reliable static seal between the support plate 38 and the top of the bowl 46. Alternatively, a seal may be provided between the top plate 82 of the particle trap and the bowl 46, so that steam cannot pass upward into engagement with the support plate 38. Outlet bend tube 96 transmits steam from the particle trap 80 to the block 98, which in turn is supported on the support plate 38. Each of the bend tubes 74 and 96 may fit tightly within respective apertures in the support plate 38 so that steam cannot pass upward between the support plate 38 and the exterior surface of these tubes. If desired, various conventional seals (not shown) may be used to provide a reliable static seal between the support plate 38 and each of the bend tubes 74 and 96.

Referring to FIGS. 1 and 2, the distiller 10 includes a vent valve 100 for venting gas from the flow line 96 between the particle trap 80 and the condenser. The vent valve 100 may be a simple plug 102 for stopping a vent port in the block 98. According to the present invention, the plug 102 is mounted on a substantially horizontal flap 104, which in turn is pivotally connected at 106 to the block 98. Air from the powered fan moving past the condenser lifts the flap 104 upward, thereby slightly raising the plug 102 and venting gas from the line 96. When the fan is not operating, the lever action of the relatively light weight flap 104 is sufficient to position the plug 102 for blocking fluid communication out the line 96, thereby minimizing the likelihood of contamination.

Referring again to FIG. 1, steam passes from the particle trap 80 through the substantially horizontal tube 106, and enters the condenser unit 108. The flow paths in the condenser 108 are each arranged within a substantially horizontal plane, so that condensate formed within condenser 108 passes through the substantially horizontal outlet tube 110 and then into the famished water holding tank 112. The finished water holding tank includes a manual water valve 114, so that the user may selectively open the valve 114 to obtain a cup of clean water. The plurality of probes 116 may be provided within and extend through the top of the tank 112 for monitoring the level and condition of water in the holding tank. The probes 116 may be similar to the tank probes described in detail in U.S. Pat. No. 5,484,510. The probes 116 are. interconnected with the distiller controller described subsequently, although again the electrical lines between the controller and the probes 116 are not shown in FIG. 1. An electrically powered thermal cap 113 such as that manufactured by Melcor, a subsidiary of Nycor, may be used to cool the water in the tank 112. If desired, an electrically powered heating unit may alternatively be used to heat condensate in the water tank. Due to the substantial weight of water-filled tank 112, a plurality of tank mounting bolts 118 may be provided for structurally suspending the tank 112 directly from the plate 32.

FIG. 1 depicts an electrically powered fan 120 for blowing air upward through the condenser unit 108 and through the circular air discharge port 122 (see FIG. 4) in the support plate 32. A plastic shroud 124 as shown in FIG. 4 may be provided for increasing the efficiency of air discharged by the fan 120. It is a particular feature of the present invention that distiller 10 maintain a compact arrangement. To accomplish this objective, the flow lines in the distiller 108 are arranged in a horizontal plane, and the fan 120 blows air upward past the condenser unit 108 then out the port 122. The fan 120 is supported on an intermediate shelf 126 within the housing 14, and louvers 15 in the bottom of the housing 14 allow air to enter the housing for being discharged upward past the condenser unit 108. A distiller controller 130 is also provided within the housing 14, and preferably is a microprocessor-based controller. Conventional 110 volt electrical power may be provided to the distiller 10 through electric cord 129. Transformer 128 is provided for outputting electrical power at the desired voltage to power the fan 120, and to provide a reliable source of power for the controller 130. A power switch 132 is provided on the housing 14 for selectively terminating electrical power to the distiller. An operator powered sterilization switch 134 is also provided for periodically sterilizing the distiller. Light 136 indicates when power to the distiller is on. A total dissolved solids indicator 138 may be turned on by the controller when the level of total dissolved solids water within the heating bowl rises to a preselected value. Other details with respect to a suitable technique for sterilizing the distiller are disclosed in U.S. Pat. No. 5,484,510. For example, a light may also be provided for indicating to the operator that the distiller should be cleaned.

The housing also includes a remote tank sensor plug 140. Either the tank 112 or another finished water holding tank may be provided at a remote location. The remote tank may be interconnected by conventional condensate flow lines with the tank 112 or directly to the output from the condenser 108. The plug 140 thus allows the electrical input from the tank probe assembly including a plurality of probes 116 to be input to the controller, so that the condition of the finished water in the remote holding tank may be monitored. Operator selector 142 provides for controlling the distillation rate of the distiller, as explained subsequently.

The controller includes a voltage regulator 144 for providing a desired voltage potential between the heating probes 34 and 36. Each probe 34 and 36 may thus be maintained at a desired voltage, as explained hereafter, in order to heat the water and generate steam. It is a particular feature of the present invention that the heating probes are not conventional high resistance probes which generate heat which is then transmitted to the water in a manner conventional with distillers. Instead, the heating concept of the present invention preferably utilizes a voltage potential between probes, so that electrical current is transmitted through the water between the probes, thereby both heating the water and killing microorganisms within the water. Although the distiller of the present invention may be reliably operated with first and second probes as disclosed herein, those skilled in the art will appreciate that additional probes may also be provided. Accordingly, a larger distiller may comprise a pair of probes each at the same voltage potential on one side of the distiller, and a corresponding pair of probes each at another voltage potential on the opposing side of the distiller, so that the current is passed from either of the probes on one side of the distiller to the probes on the other side of the distiller.

Figure 3:
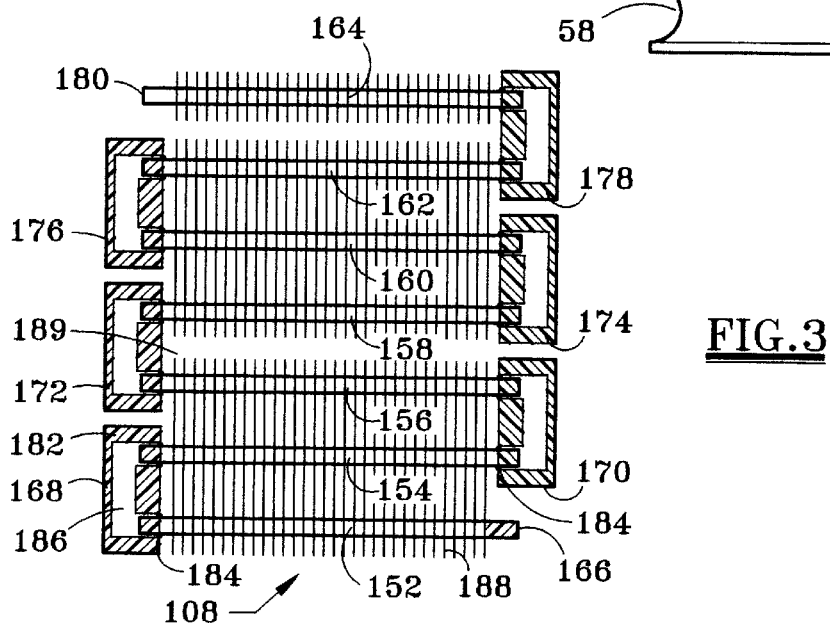
FIG. 3 is a detailed view of a suitable condensing radiator, partially in cross-section, according to the present invention.

FIG. 3 illustrates in greater detail a suitable condenser 108 for cooling the steam and thereby generating the condensate. Condenser 108 includes a plurality of tubes 152, 154, 156, 158, 160, 162 and 164 each preferably having a central axis which lies within a common horizontal plane. Steam from the particle trap 80 is received in the condenser steam inlet 166 of the tube 152, and passes through the tube 152 and through the plastic end cap 168 to the tube 154. End cap 170 is provided for fluidly connecting tubes 154 and 156. End cap 172 fluidly connects tubes 156 and 158, end cap 174 fluidly connects tubes 158 and 160, end cap 176 fluidly connects tubes 160 and 162, and end cap 178 fluidly connects tubes 162 and 164. Condensate or finished water is thus discharged from the outlet 180 of the tube 164, and is then transmitted to the holding tank.

End cap 168 includes a plastic material block 182 with an inlet port and an outlet port sized to receive the ends of the respective tubes 152 and 154. A conventional O-ring 184 provides static sealing engagement between each tube and the plastic material end block. Flow path 186 in the block 182 fluidly connects the inlet port and outlet port in the block. Tubes 152–164 may each be fabricated form stainless steel, and each tube includes a plurality of spaced aluminum fins 188 in thermal contact with each stainless steel tube. FIG. 3 illustrates tubes 152, 154, and 156 each connected to one bank of fins, tubes 158, 160, and 162 connected to another bank of fins, and tube 164 having its own fins. The gaps 189 between the banks of fins facilitate maintaining the steam or condensate within the tubes in one bank of fins at substantially the same temperature, thereby achieving more effective cooling. The first bank of fins may thus operate at a temperature significantly higher than the second bank of fins. Condensation may occur in the tubes connected with the first bank of fins, so that the second bank of fins cools the condensate (water). The third bank of fins may further cool the condensate, so that the user is not exposed to high temperature water. By providing banks of fins separated by an air gap with each bank of fins structurally connected to an upstream or downstream flow line portion of the condenser unit, the required air flow rate from the powered fan is reduced, thereby allowing the distillation unit to operate at a comparatively low noise level. Those skilled in the art will appreciate that additional tubes may be provided for the last bank of fins, and that both the number of tubes in each fin bank and the number of fin banks may be adjusted for a particular application.

Air from the fan 120 thus blows past and between the substantially vertical fins 180 to cool the tubes and thereby generate condensate from the steam input to the condenser. A particular feature of the present invention is the low cost for manufacturing the condenser. The condenser 108 may be easily removed from the housing 14, and the plastic end caps removed so that each tube may be easily cleaned with a brush or similar cleaning tool.

When mounting the distiller 10 below a countertop or cabinet C, a plurality of spacers 190 are used to provide an air flow gap between the lower surface S of the cabinet C and the support plate 32. Suitable connecting members such as bolts (not shown) may thus pass through each of the spacers 190 and structurally interconnect the cabinet C with the support plate 32. Air discharged through the circular hole 122 in the support plate may thus flow in a substantially horizontal direction between the plate 32 and the cabinet C. It is a particular feature of the present invention that the distiller is designed for mounting beneath a cabinet, countertop, or other substantially horizontal support surface, thereby allowing the distiller to be mounted in a variety of locations which have relatively low utility.

Referring to FIG. 4, it should be understood that substantially the same distiller as previously discussed is depicted, but without the spacers 190 so that the distiller may be mounted on a wall or may be self-supporting. Accordingly, the distiller may be provided with a plate-type wall mounting bracket 192 which is simplistically shown on the left side of FIG. 4. The housing 16 and the horizontal support plate 32 may each be provided with connecting slots 194 for mechanically supporting the distiller from tabs 195 extending from the bracket 192. A plurality of holes 197 may be provided in bracket 192 for securing the bracket to a wall with conventional securing bolts (not shown). Various types of mechanical interconnections between the wall mounting bracket and a distiller are possible. Also shown in FIG. 4 is a simplistic support stand 196 on the right side of the housing 12. The support stand 196 may comprise a pair of identical support plates each on one side of the distiller assembly for supporting the distiller on a countertop or other substantially horizontal surface. Connecting slots 194 as previously described may be provided both on the housing 12, the housing 16 and the ends of the plate 32 for engagement with tabs 195 of the opposing support plates. Alternatively, four support legs may be used rather than two support plates for supporting the distiller on the countertop.

The operation of the distiller will now be described, followed by an explanation of periodic maintenance for the distiller. It will be assumed for purposes of this discussion that the distiller 10 has been interconnected with a municipal water system at shutoff valve 64. The distiller 10 may have a maximum condensate output of, for example, 12 gallons per day. At that condensate generation rate, the unit may use 13 amps of 110 volt electrical current. A higher electrical usage would trip a circuit breaker (not shown) within the housing 14, requiring the checking and resetting of the distiller unit. The flow regulator 18 limits water inlet flow to a selected value which is higher than the maximum condensate output rate of the distiller 10, e.g., 1 gallon per hour, thereby limiting flow to the electrically controlled water inlet valve 70.

The operator turns the distiller 10 on by switch 132, and sets the control selector 142 for a desired condensate output. If the distiller is used in a home, the selector 142 normally may be set at a low distillation rate of 6 gallons per day, thereby resulting in slow distillation and little noise generated by the distiller 10. If a party is planned and the holding tank 112 is nearly empty, or if the distiller is used by numerous individuals in an office, the selector 142 may be set at a higher rate of 12 gallons per day. In either case, the distiller will automatically shut down in response to the sensor 116 when the holding tank 112 is full.

In response to the setting of the selector 142, the controller 130 calculates the desired flow rate of water through the valve 70. Preferably the controller 130 is responsive to various signals other than the setting from the selector 142 to determine the desired water flow rate. Controller 30 may, for example, be responsive to sensors 116 which provide signals indicative of the level of water in the holding tank 112, since the desired distillation rate will be lower when the tank is nearly full. Also, the controller 130 may be responsive to the level of electrical power last used during the distillation operation at the same setting of selector 142. Assuming the water W in the heating bowl 46 contains an average level of contaminants, the logic within the controller 130 may calculate a theoretical distiller electrical usage of, for example, four amps of power at that setting. If the distiller used only three amps of electrical power during its last operation at that setting, the amount of electrolytes in the water W would likely be higher than normal. Accordingly, the controller 130 may reduce the water input rate which, as explained subsequently, will lower the amperage used by the distiller.

A primary feature of this invention is that the controller 130 determines the desired flow rate through the valve 70 to control the distillation rate, rather than regulating electrical power to the distiller to control the distillation rate. Due to heating by applying a voltage potential between the heating probes and using the conductivity of the water to heat the water, the amount of steam generated is not solely a function of the electrical voltage supplied to the heating probes. The level of electrolytes in the water may vary considerably, and this varying conductivity of the water effects the electrical power required to generate steam. Accordingly, the controller 130 may alter the voltage potential output from the voltage regulator 144, the frequency of electrical current applied to the heating probes 34 and 36, and the maximum amperage which may be transmitted to the heating probes. The controller 130 primarily regulates the distillation rate, however, by controlling the flow rate of water through the water inlet valve 70. While this regulation of valve 70 may be accomplished by various techniques, preferably the controller 130 generates a series of pulses, with each pulse activating the valve 70 to allow a preselected quantity of water to pass through the valve with that pulse. The frequency and/or the duration of the pulses thus determines the flow rate through the valve 70. Six hundred pulses per minute from the controller 130 will result in flow through the valve which is twice the rate when the valve 70 receives 300 pulses per minute. It should be understood that pulsing of the valve 70 occurs very quickly, and accordingly within a time period of several minutes the output from the valve 70 provides a substantially constant flow rate of incoming water to the bowl 46, rather than pulses of incoming water.

The water level in the bowl is maintained substantially at the same level as the horizontal plates 42 at the end of the probes. The plates 42 are positioned so that there is a relatively low quantity of water, e.g., one-half inch of water, within the bowl 46. Depending on the level of minerals, contaminants, and electrolytes within the water, the operator may add a small quantity of salt to the water in the bowl 46 to increase the electrolyte level. No power is used until the water level rises to engage the lowermost end of the probes 34 and 36, since water contact between the probes 34 and 36 is required to transmit power between the varying potential probes. Once the water rises to engage the rod extensions 44 beneath the plates 42, a small amount of current will flow through the water, thereby beginning the heating of the water. The surface area provided by the rod extensions 44 in contact with the water is relatively low, so that no significant amount of energy is used and little if any steam is generated at this time. The rod extensions 44 are important, however, since this initial flow of current through the water begins ionization of the water so that ions are held in suspension and readily available for conducting larger amounts of current when the water level rises to engage the plates 42.

Although the plates 42 are generally horizontal, it should be understood that at least one of the plates 42 at the lower end of the heating probes 34 and 36 will typically be slightly tilted or inclined relative to the horizontal level of water in the heating bowl 46. Accordingly, as the water level rises above the rod extensions 44, the contact area of the lowermost surface of that plate 42 increases dramatically with a slight increase in the water level. As the area contact between one or both plates 42 and the water increases, the amount of current which is transmitted between the varying potential probes increases dramatically, thereby heating water and generating steam. This increased generation of steam lowers the water level slightly in the bowl 46, thereby reducing the area contact between the plates and the water and thus reducing the amperage transmitted between the probes 34 and 36. Accordingly, the system of the present invention effectively balances the level of water in the bowl 46, which is a function of the flow rate of the valve 70, with the power used by the distiller to generate steam. By providing heating probes with horizontal plates 42 each with a large surface area of, for example, three square inches for engagement with the water, a substantially constant water level is obtained in the bowl. In most applications, the water level in the bowl 46 will never rise vertically above the highest point of the lower surface of the plates 42. It should be understood, however, that if the water level rises above the lower surface of both plates 42 and contacts the upper surface of the plates 42, the amount of power transmitted between the probes is significantly increased by doubling the area contact of the plates 42 with the water, thereby generating a substantially higher rate of steam generation and lowering the water level in the bowl 46.

A significant feature of the present invention is that a substantial horizontal spacing is provided between the probes 34 and 36, and thus between the plates 42 at the lower end of these probes. By utilizing water as a conductive medium for transmitting electrical current through the water and thereby heating the water, the electrical current is used to both heat the water and to kill bacteria and microorganisms within the water, thereby reducing the level of contaminants in the condenser unit 108 and the holding tank 112. Since the substantial area of water between the plates 42 is heated by the transmitted current, the generated steam slowly rises within a relatively large surface area. Accordingly, there is less chance of contaminants being caught in a column of fast rising steam which commonly occurred when the water was heated by conventional high resistance heating probes used in prior art distillers. Generated steam rises within the chamber 47 within the heating bowl 46, and preferably a physical separation of at least two inches exists between the top of the water level in the heating bowl and the horizontal trap 80, so that contaminants have a high probability of dropping back into the heated water before entering the horizontal particle trap. Because the heating bowl 46 is fabricated from plastic materials and because salt can be added to increase the electrolytes in the water, minerals within the water do not tend to attach to the sides of the inner wall 56 of the heating bowl 46, but rather are desirably kept in suspension in the water.

Steam rising within the chamber 47 enters the horizontal particle trap 80 through the inlet 86. Due to the effect of steam passing through a relatively small inlet opening 86 and then expanding into the large volume chamber 86, the velocity of the steam increases rapidly when passing through inlet port 86, then slows dramatically within the chamber 87. Contaminants within the steam in the chamber 87 are attracted to condensation on the walls of the plates 82 and 84, and are carried back to the water in the heating bowl as condensate accumulating within the horizontal particle trap 82 slowly drips back to the heated water with the bowl 46.

Steam with a very low level of contaminants passes through the bend tube 96 and continues horizontally through the flow tubes within the condenser unit 108. By providing condenser unit 108 with plastic end caps as shown in FIG. 3, the cost of the condenser unit 108 is substantially reduced. The plastic end caps fluidly interconnecting the stainless steel tubes of the condenser unit 108 also tend to reduce the noise output by the distiller. The distilled condensate then flows to the holding tank 112. Both the water level and the totally dissolved solids level of the condensate within holding tank 112 be monitored by the sensors 116. As previously indicated, the water in the holding tank 112 may be cooled to a desired temperature by the thermal cap unit 113.

When steam is being generated in the heating bowl 46, the controller 130 may automatically activate the fan 120 to pass air upward between the fins of the condenser unit 108, then out the hole 122 in the top support plate 32. This powered upward movement of air by the fan 120 will slightly raise the flap 104, thereby lifting the stopper 102 off its seat and allowing for venting of gasses from the flow line upstream from the condenser unit. The controller 130 will terminate power to the fan 120 when the flow through the water inlet valve and the voltage potential between the heating probes 34 and 36 are simultaneously terminated, thereby allowing the stopper 102 to reseat and automatically resealing the bend flow line 96.

Periodic maintenance of the distiller 10 will enhance its useful life and desirably keep the level of dissolved solids in the holding tank 112 at a satisfactory level. To perform periodic maintenance, the operator will first terminate electrical power to the distiller at switch 132. The ring 48 on the housing 12 and the flange 50 on the holding tank 46 may provide a mechanical interlock to physically prevent removal of the holding tank 46 until the temperature of the holding tank 46, and thus the temperature of water in the heating bowl 46, is reduced to a desired value for safe handling of the heating bowl. This mechanical interlock may be accomplished, for example, by providing a timed solenoid which retracts a stop (not shown) only after the switch 132 has been deactivated for a selected period of time. Until the solenoid retracts the stop, the stop thus physically prevents removal of the heating bowl 46 from the ring 48. The mechanical interlock 48 may also be designed to physically prevent removal of the heating bowl 46 unless switch 132 is activated to terminate electrical power to the distiller 10. Alternatively, the material for the outer layer 54. of the heating bowl 46, the flange 50, and the ring 48 may be selected so that the thermal expansion of these components mechanically prevents removal of the heating bowl 46 until the heating bowl has cooled to a selected value. After the water within the heating bowl 46 cools to a safe value, the thermal contraction of these component allows for the safe removal of the heating bowl.

It is a particular feature of the present invention that the heating bowl 46 may be easily removed for cleaning operations by simply disconnecting the heating bowl 46 from the housing 12, then lowering the heating bowl, as shown in FIG. 2, with the heating probes 34 and 36 remaining attached to the housing 12. The remaining water in the heating bowl 46 may be dumped, and the interior plastic wall 56 of the heating bowl easily wiped cleaned. If desired, the entire heating bowl 46 may be placed in a dishwasher for periodic cleaning. With the heating bowl 46 removed, the water inlet tube 76 may be pulled downward off the seal 78 at the lower end of the bend tube 74. Tube 76 may also be brushed clean to remove any deposits on the interior surface of the tube 76. Heating probes 34 and 36 may also be inspected, but normally would not be removed.

Less frequently, the condensing unit 108 and the holding tank 112 may be removed and periodically cleaned. To clean the condensing unit 108, the housing 14 may be disconnected from both the support plate 32 and the housings 12 and 16, so that the controller 130 and the fan 120 may be lowered as a subassembly with the housing 14. The horizontal lines 106 and 110 may be disconnected from the condenser 108, and the entire condenser unit 108 as shown in FIG. 3 removed for cleaning. During cleaning of the condenser unit, the plastic end caps may be easily removed from the respective stainless steel flow lines, and the interior of the flow lines brushed clean. The holding tank 112 may be removed from the support plate 32 and cleaned in a conventional manner. The condenser unit 108 and the holding tank 112 may then be reinstalled to their position as shown in FIG. 1.

Once cleaned, the water inlet tube 76 may be returned to its position as shown in FIG. 1, and the bowl 46 re-connected to the housing 12. An electrical interlock 51 is provided, as shown in FIG. 1, for preventing electrical power from being reapplied to the distiller until a signal from electrical interlock 51 to the controller 130 indicates that the bowl 46 is in its proper position with respect to the housing 12. Thus electrical voltage potential cannot be applied between the probes 34 and 36 when the heating bowl 46 is removed from the housing 12, even if the operator accidently turns the switch 132 back on.

When the cleaned bowl 46 has been replaced on the housing 12, a small amount of salt may be added to the bowl so that the desired level of electrolytes will be present in the incoming water when the distiller unit is turned on. The distiller 10 as described herein may include a plurality of probes 94 within the heating bowl 46 for measuring the total dissolved solids level of the water in the heating bowl. This measurement may be accomplished in a manner described in U.S. Pat. No. 5,484,510. Also, the process of sterilizing the distiller as described in that patent may be used to intermittently sterilize the distiller according to the present invention.

Those skilled in the art should understand that the arrangement of housings supported on the plate 32 as described herein is preferred, although other arrangements are possible. Rather than being placed side-by-side, one or more of the heater housing, the fan and control housing, and the holding tank housing could be placed behind another housing. It is a particular feature of the invention, however, that the steam flowing out the particle trap remain substantially within a horizontal plane until condensate is formed, which may then flow by gravity to the holding tank.

In other embodiments, the cost of the distiller may be further reduced by eliminating the control circuit. Rather than being connected to a pressurized water input line, the distiller may include an upper reservoir for periodic filling by the operator in a manner similar to a conventional coffee maker. A control valve along a gravity line interconnecting the fill reservoir with the bowl 46 may be manually set at a flow rate for dripping incoming water into the bowl. The control valve may be manually set at any desired flow rate, although the maximum flow rate through the control valve will preferably nevertheless result in the water level in the bowl not rising above the level of the plates 42. The power to the heating probes thus maintains the substantially constant water level in the bowl, as previously discussed. The more economical distiller will likely be self-supporting, and preferably uses a particle trap and a condenser as disclosed herein to reduce contamination. The distiller is also designed for easy cleaning by utilizing an easy removal heating bowl, a removable water inlet tube, and an easy cleaning condenser unit. The fill tank may also be structurally separate from the distiller, so that the user pours contaminate water into the distiller, sets the control valve at a desired flow rate, then places a suitable container under the water outlet from the distiller for receiving the condensate.

The distiller 10 according to this invention is light weight and may be manufactured at a relatively low cost. The extensive use of plastic materials, particularly for the heating bowl, the particle trap, and the end caps of the condenser unit reduce cost and weight, and allow for easy cleaning of the distiller. It should thus be appreciated that various changes in the specifics of construction and distiller operation as disclosed above may be made while still achieving the purposes and objects of this invention.

The foregoing disclosure and description of the invention is illustrative and explanatory thereof, and it will be appreciated by those skilled in the art that various changes in the size, shape and materials, as well as in the details of the illustrated construction or combinations of features of the various elements may be made without departing from the spirit of the invention, which is defined by the following claims.

What is claimed is:

1. A distiller for heating incoming water and generating condensate from steam, the distiller comprising:
    a heater housing including a top plate and a side plate forming an inverted cup defining an interior cavity therein;
    first and second heating probes each secured at an upper end within the interior cavity in the heater housing and extending downward therefrom;
    an electrically non-conductive heating bowl positioned about the first and second heating probes, an upper end of the heating bowl being configured for removable sealing engagement with the heater housing;
    a water inlet flow line for transmitting incoming water to the heating bowl;
    a power unit for applying a voltage potential between the first and second heater probes to transmit current through water in the heating bowl and thereby heat the water to generate steam;
    a condenser unit for receiving the generated steam and outputting condensate;
    a powered fan for blowing air past the condenser unit;
    a support plate for supporting the heater housing, the first and second probes, the heating bowl, and the condensing unit each positioned below the support plate, the support plate including an air flow port therein opposite the condenser unit with respect to the powered fan; and
    a holding tank for receiving condensate from the condenser unit.

2. The distiller as defined in claim 1, further comprising:
    the holding tank supported by and positioned below the support plate, the condenser unit being positioned horizontally between the heating bowl and the holding tank; and
    a plurality of spacers for positioning between the support plate and a mounting surface, the plurality of spacers forming a planar air gap above the support plate for discharging air passing through the air flow port in the support plate.

3. The distiller as defined in claim 1, further comprising:
    a vent valve positioned along a steam flow line upstream from the condenser unit for venting gas from the distiller; and
    a flap movably responsive to the flow of air past the condenser unit by the powered fan for opening and closing the vent valve.

4. The distiller as defined in claim 1, further comprising:
    a particle trap within the heater housing, the particle trap having a lower substantially horizontal plate with a steam inlet opening, an upper substantially horizontal plate with a steam outlet opening, the steam outlet opening being spaced horizontal from the steam inlet opening, a substantially planar gap between the first and second plates for steam flow between the inlet opening and the outlet opening, and at least one drip opening in the lower plate for dripping contaminant-containing condensate to the water in the heating bowl.

5. The distiller as defined in claim 1, further comprising:
    an electrical interlock responsive to the position of the heating bowl with respect to the heater housing for automatically terminating electrical power from the power unit to the first and second heater probes when the heating bowl is removed from the heater housing.

6. A distiller for heating incoming water and generating condensate, the distiller comprising:
    a heater housing defining an interior cavity therein;
    first and second heating probes each secured at an upper end within the interior cavity in the heater housing and extending downward therefrom, each heating probe including a plate portion at a lower end thereof;
    a heating bowl positioned about the first and second heating probes, an upper end of the heating bowl being configured for removable sealing engagement with the heater housing;
    a water inlet flow line for transmitting incoming water to the heating bowl;
    an inlet water valve along the water inlet flow line for controlling the flow rate of water to the heating bowl;
    a particle trap within the heater housing the particle trap having a lower substantially horizontal plate with a steam inlet opening, an upper substantially horizontal plate with a steam outlet opening and spaced horizontal from the steam inlet opening, and a substantially planar gap between the first and second plates for steam flow between the inlet opening and the outlet opening;
    a power unit for applying a voltage potential between the first and second heater probes to transmit current through water in the heating bowl and thereby heat the water to generate steam; and
    a condenser unit for receiving the generated steam and outputting condensate.

7. The distiller as defined in claim 6, further comprising:
    a water inlet tube having an upper end removably positioned within the heater housing and fluidly connected to the water inlet flow line for transmitting incoming water from the heater housing to a lower end of the heating bowl.

8. The distiller as defined in claim 6, further comprising:
    a vent valve positioned along a steam flow line upstream from the condensing unit for venting as from the distiller;

the condenser unit includes a plurality of banks of fins, a first bank of fins being structurally connected to a first upstream flow line portion of the condenser unit and structurally separate from a second flow line portion of the condenser unit, and a second bank of fins being structurally connected to the second flow line portion of the condenser unit downstream from the first upstream flow line portion and structurally separate from the first flow line portion of the condenser unit;

a powered fan for blowing air past the condenser unit; and a flap movably responsive to the flow of air past the condensing unit by the powered fan for opening and closing the vent valve.

9. A distiller for heating incoming water and generating condensate, the distiller comprising:

a heater housing defining an interior cavity therein;

first and second heating probes each secured at an upper end within the interior cavity in the heater housing and extending downward therefrom;

a heating bowl positioned about the first and second heating probes, an upper end of the heating bowl being configured for removable sealing engagement with the heater housing;

a water inlet flow line for transmitting incoming water to the heating bowl;

an inlet water valve along the water inlet flow line for controlling the flow rate of water to the heating bowl;

a power unit for applying a voltage potential between the first and second heater probes to transmit current through water in the heating bowl and thereby heat the water to generate steam;

a condenser unit for receiving the generated steam and outputting condensate;

a vent valve positioned along a steam flow line upstream from the condenser unit for venting gas from the distiller; and a flap movably responsive to flow of air past the condenser unit for opening and closing the vent valve.

10. The distiller as defined in claim 9, wherein the condenser unit comprises:

a plurality of banks of fins, a first bank of fins being structurally connected to a first upstream flow line portion of the condenser unit and structurally separate from a second flow line portion of the condenser unit, and a second bank of fins being structurally connected to the second flow line portion of the condenser unit downstream from the first upstream flow line portion and structurally separate from the first flow line portion of the condenser unit.

11. The distiller as defined in claim 9, wherein each of the heating probes further comprises:

a plate portion at a lower end of each heating probe, the plate portion lying within a plane substantially parallel to an upper surface of the water in the heating bowl.

12. A distiller for heating incoming water and generating condensate, the distiller comprising:

a heater housing defining an interior cavity therein;

first and second heating probes each secured at an upper end within the interior cavity in the heater housing and extending downward therefrom;

a heating bowl positioned about the first and second heating probes, an upper end of the heating bowl being configured for removable sealing engagement with the heater housing;

a water inlet flow line for transmitting incoming water to the heating bowl;

an inlet water valve along the water inlet flow line for controlling the flow rate of water to the heating bowl;

an electrical interlock responsive to the position of the heating bowl with respect to the heater housing for automatically terminating electrical power to the first and second heater probes when the heating bowl is removed from the heater housing;

a power unit for applying a voltage potential between the first and second heater probes to transmit current through water in the heating bowl and thereby heat the water to generate steam; and a condenser unit for receiving the generated steam and outputting condensate.

13. The distiller as defined in claim 12, further comprising:

a flow controller upstream from the inlet water valve for controlling the flow rate of the water to the inlet water valve.

14. The distiller as defined in claim 12, further comprising:

a water inlet tube having an upper end removably positioned within the heater housing and fluidly connected to the water inlet flow line for transmitting incoming water from the heater housing to a lower end of the heating bowl.

15. The distiller as defined in claim 12, further comprising:

a vent valve positioned along a steam flow line upstream from the condensing unit for venting gas from the distiller; and a flap movably responsive to flow of air past the condensing unit for opening and closing the vent valve.

16. A method of controlling the operation of a water distiller comprising: providing first and second heating probes, a heating bowl positioned about the first and second heating probes for receiving incomning water from a water inlet flow line, a power unit for applying a voltage potential between the first and second heater probes, a condenser unit for receiving the generated steam and outputting condensate, and a substantially horizontal plate at a lower end of each heating probe in said water distiller;

positioning an water inlet water valve along the inlet flow line;

controlling the water inlet valve to regulate the flow rate of water to the heating bowl;

positioning a vent valve along a steam flow line upstream from the condenser unit for venting gas from the distiller;

powering a fan to move air past the condenser unit;

positioning a flap movably responsive to the flow of air past the condenser unit by the powered fan for automatically opening and closing the vent valve;

activating the power unit as a function of the area contact between the horizontal plates and the water in the heating bowl to maintain a substantially constant level of water in the heating bowl; and transmitting current through water in the heating bowl and thereby heat the water to generate steam.

17. The method as defined in claim 16, further comprising:

providing a flow controller upstream from the inlet water valve for controlling the flow rate of water to the inlet water valve.

18. The method as defined in claim 16, further comprising:

automatically terminating electrical power from the power unit to the first and second heater probes when the heating bowl is removed from the heater housing.

19. The method as defined in claim 16, further comprising:

removably positioning a water inlet tube within the heating bowl and fluidly connected to the water inlet flow line for transmitting incoming water from the inlet flow line to a lower end of the heating bowl.

\* \* \* \* \*